United States Patent
Zhang et al.

(10) Patent No.: US 9,973,793 B2
(45) Date of Patent: May 15, 2018

(54) METHOD AND APPARATUS FOR PROCESSING VIDEO IMAGE

(71) Applicant: BAIDU ONLINE NETWORK TECHNOLOGY (BEIJING) CO., LTD., Beijing (CN)

(72) Inventors: Jing Zhang, Beijing (CN); Dandan Shao, Beijing (CN); Zhenhua Xu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 43 days.

(21) Appl. No.: 14/392,326

(22) PCT Filed: Oct. 30, 2014

(86) PCT No.: PCT/CN2014/089946
§ 371 (c)(1),
(2) Date: Dec. 23, 2015

(87) PCT Pub. No.: WO2015/081776
PCT Pub. Date: Jun. 11, 2015

(65) Prior Publication Data
US 2016/0277779 A1    Sep. 22, 2016

(30) Foreign Application Priority Data
Dec. 4, 2013 (CN) .......................... 2013 1 0646783

(51) Int. Cl.
*H04N 21/2343* (2011.01)
*H04N 21/414* (2011.01)
*H04N 21/488* (2011.01)
*H04N 21/43* (2011.01)
*H04N 21/61* (2011.01)
(Continued)

(52) U.S. Cl.
CPC .............. *H04N 21/234381* (2013.01); *H04N 21/41407* (2013.01); *H04N 21/4302* (2013.01);
(Continued)

(58) Field of Classification Search
CPC ..... H04N 21/234381; H04N 21/41407; H04N 21/4302; H04N 21/4332; H04N 21/4333;
(Continued)

(56) References Cited

U.S. PATENT DOCUMENTS 8,332,530 B2 * 12/2012 Wei .................. G06F 3/0481
707/769
2007/0011706 A1    1/2007 Chiu et al.
(Continued)

FOREIGN PATENT DOCUMENTS

CN    101770701    7/2010
CN    101901619    12/2010
(Continued)

OTHER PUBLICATIONS

WIPO, International Search Report for PCT/CN2014/089946, dated Jan. 28, 2015.

*Primary Examiner* — Omar S Parra
(74) *Attorney, Agent, or Firm* — Hodgson Russ LLP (57) ABSTRACT

Provided are a method and an apparatus for processing a video image. The method for processing a video image comprises: acquiring information of a current video; intercepting key images of the current video according to the information of the current video, each key image comprising a video frame image with a complete subtitle; sequencing the key images to generate an image library; and receiving a playing request, and according to the playing request, reading, from the image library, corresponding key images for playing.

12 Claims, 5 Drawing Sheets

(51) Int. Cl.
*H04N 21/433* (2011.01)
*H04N 21/439* (2011.01)

(52) U.S. Cl.
CPC ..... *H04N 21/4884* (2013.01); *H04N 21/6131* (2013.01); *H04N 21/4332* (2013.01); *H04N 21/4333* (2013.01); *H04N 21/4394* (2013.01)

(58) Field of Classification Search
CPC ........... H04N 21/4394; H04N 21/4884; H04N 21/6131
See application file for complete search history.

(56) References Cited

U.S. PATENT DOCUMENTS

| | | | |
|---|---|---|---|
| 2007/0292102 A1 | 12/2007 | Usami | |
| 2011/0134321 A1* | 6/2011 | Berry | G11B 27/10 348/464 |
| 2011/0149153 A1* | 6/2011 | Nam | H04N 21/4307 348/468 |
| 2013/0080384 A1* | 3/2013 | Briggs | G06F 17/30026 707/610 |

FOREIGN PATENT DOCUMENTS

| | | |
|---|---|---|
| CN | 102364960 | 2/2012 |
| CN | 102685574 | 9/2012 |
| CN | 103020076 | 4/2013 |
| JP | H08292965 | 11/1996 |
| JP | H11313048 | 11/1999 |
| JP | 2009049510 | 3/2009 |
| JP | 2009076970 | 4/2009 |
| JP | 2010233019 | 10/2010 |
| JP | 2011061670 | 3/2011 |
| JP | 2013030963 | 2/2013 |
| KR | 20070084471 | 8/2007 |

* cited by examiner

```
00:00:23,450 : 3.484,
00:00:23,450 -tween-1: 6.967,
00:00:23,450 -tween-2: 10.451,
00:00:23,450 -tween-3: 13.935,
00:00:23,450 -tween-4: 17.419,
00:00:31,417 : 20.196,
00:00:31,417 -tween-1: 22.974,
00:00:31,417 -tween-2: 25.752,
00:00:38,087 : 28.887,
00:00:38,087 -tween-1: 32.022,
00:00:44,797 : 35.447,
00:00:44,797 -tween-1: 38.871,
00:00:51,897 : 42.782,
00:00:51,897 -tween-1: 46.692,
00:00:59,777 : 50.319,
00:00:59,777 -tween-1: 53.945,
00:01:06,597 : 57.314,
00:01:06,597 -tween-1: 60.682,
00:01:13,407 : 64.137,
00:01:13,407 -tween-1: 67.592,
00:01:21,639 : 71.577,
```

METHOD AND APPARATUS FOR PROCESSING VIDEO IMAGE

CROSS-REFERENCE TO RELATED APPLICATION

This application claims priority to Chinese Patent Application Serial No. 201310646783.6, titled "Method and Apparatus for Processing Video Image" filed by Baidu Online Network Technology (Beijing) Co., Ltd on Dec. 4, 2013.

FIELD

Embodiments of the present invention generally relate to a field of communication technology, and more particularly to a method for processing a video image and an apparatus for processing a video image.

BACKGROUND

With the rapid development of terminal technology, applications of various functions become more and more diversified, and the user is inclined to conduct many activities, such as business, entertainment, life activities, etc., by installing different applications on the terminal.

Currently, many users would like to view online videos on the mobile terminal. However, it costs much mobile data traffic for viewing online videos. If the user views a video for 1 minute on the mobile phone, it will cost about 4 M of mobile data traffic for the standard resource, and about 20 M of mobile data traffic for the high definition resource. For most users having hundreds of megabytes of mobile data traffic per month, there is a barrier to view online videos.

In addition, influenced by the network speed, video resources, performances of the mobile phone and other factors, there is always a case that the video is not smooth during viewing. When the video is not smooth, almost half of users will leave the page or exit the application, and thus the user's requirement for viewing videos cannot be fulfilled.

Since the transmission speed of the video resources is greatly influenced by the network environment, the user may only view the online video in a quiet environment with high quality mobile network, and may not view the online video in an environment with poor network, such as a subway. Meanwhile, it is not suitable to view in time fragments.

Accordingly, there are problems as follows for viewing online video: 1) a large amount of mobile data traffic is cost; 2) the video is not smooth; 3) the viewing location, and viewing time are limited.

With regard to the first problem, a current method is to provide a smooth transcoding format. With regard to the second problem, it may be solved by reducing the numbers of frames, which may be reduced low to 24 frames per second, or may be solved by replacing the video resource passively or encouraging the user to change the video node to skip the unsmooth section, after receiving a report from the user. With regard to the third problem, there is no solution currently.

Although, the above methods for transcoding smoothly or reducing the number of frames may improve the situation that the video costs a large amount of mobile data traffic and is not smooth, the current problem is still serous. The way of reporting or changing the node by the user is passive, which may only solve the unsmooth problem after the event.

SUMMARY

Embodiments of the present invention seek to solve at least one of the above problems.

Accordingly, a first objective of the present invention is to provide a method for processing a video image. By intercepting key images of a current video, sequencing the key images to generate an image library and playing the key images in the image library, mobile data traffic is saved and it may allow the user to learn about a video content quickly and conveniently.

A second objective of the present invention is to provide an apparatus for processing a video image.

In order to achieve above objectives, embodiments of a first aspect of the present invention provide a method for processing a video image. The method includes: acquiring information of a current video; intercepting key images of the current video according to the information of the current video, wherein each key image comprises a video frame image having a complete subtitle; sequencing the key images to generate an image library; and receiving a playing request, and reading corresponding key images from the image library according to the playing request for playing.

With the method for processing a video image, by acquiring the information of the current video, intercepting the key images of the current video according to the information of the current video, and sequencing the key images to generate the image library, and reading the corresponding key images from the image library according to the playing request for playing, not only the data traffic is saved, but also it enables the user to preview the video quickly in the case that the network is poor, such that the user may learn about the video content quickly and conveniently, and the possibility of quitting when the mobile video is unsmooth is reduced, thus improving the user experience.

In order to achieve above objectives, embodiments of a second aspect of the present invention provide an apparatus for processing a video image. The apparatus includes: an acquiring module, an intercepting module, a generating module and a playing module.

With the apparatus for processing a video image, by acquiring the information of the current video, intercepting the key images of the current video according to the information of the current video, and sequencing the key images to generate the image library, and reading the corresponding key images from the image library according to the playing request for playing, not only the data traffic is saved, but also it enables the user to preview the video quickly in the case that the network is poor, such that the user may learn about the drama content quickly and conveniently and the possibility of quitting when the mobile video is unsmooth is reduced, thus improving the user experience.

In order to achieve above objectives, embodiments of a third aspect of the present invention provide a storage medium for storing an application. The application is configured to execute the method for processing a video image according to the embodiments of the first aspect of the present invention.

Additional aspects and advantages of embodiments of the present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the drawings, in which.

DETAILED DESCRIPTION

Embodiments described herein with reference to drawings are explanatory, illustrative, and used to generally understand the present invention. The embodiments shall not be construed to limit the present invention. In contrast, the embodiments of the present invention may include changes, modifications and equivalents within the spirit and scope of the appended claims.

In the description of the present invention, terms such as "first" and "second" are used herein for purposes of description and are not intended to indicate or imply relative importance or significance or to imply the number of indicated technical features. In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure. In addition, in the description of the present invention, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present invention includes other implementations, not necessarily in the sequence shown or discussed here, but probably including the almost same or reverse sequence of the involved functions, which should be understood by those skilled in the art.

A method for processing a video image and an apparatus for processing a video image according to embodiments of the present invention will be described in the following with reference to drawings.

In order to solve the current problem that a large amount of mobile data traffic is cost when an online video is viewed, the online video is unsmooth seriously, and the viewing location and the viewing time are limited, the present invention provides a method for processing a video image.

Figure 1:
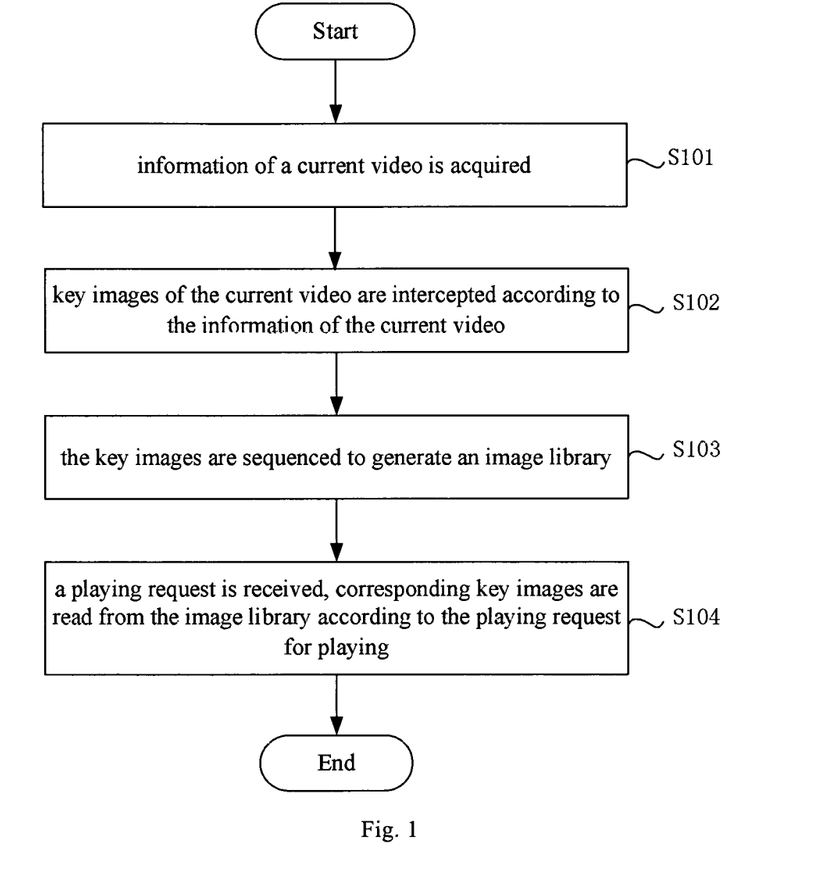
FIG. 1 is a flow chart of a method for processing a video image according to an embodiment of the present invention.

FIG. 1 is a flow chart of a method for processing a video image according to an embodiment of the present invention. As shown in FIG. 1, the method includes the following steps.

In step S101: information of a current video is acquired.

Firstly, the information of the current video is acquired from a video resource library. The information may include a path of the video resource, a path of a subtitle document, etc.

In step S102: key images of the current video are intercepted according to the information of the current video. Each key image includes a video frame image having a complete subtitle.

The key images of the current video may be intercepted by following steps. Firstly, a time point sequence of a key subtitle is acquired according to the information of the current video. After the time point sequence of the key subtitle is acquired, a frame may be added into the time point sequence of the key subtitle, or an offset correction may be performed on a time point of the key subtitles in the time point sequence of the key subtitle. Finally, the key images of the current video are intercepted according to the time point sequence of the key subtitle. It should be noted that, the steps of adding a frame and performing an offset correction are not executed in a strict order, that is, the step of adding a frame may be executed firstly, and then the offset correction is performed; or the offset correction is performed firstly, and then the step of adding a frame is executed. Moreover, the steps of adding a frame and performing an offset correction are optional. If the step of adding a frame is executed, then the above key images further include an image obtained by adding a frame according to the time interval.

In step S103: the key images are sequenced to generate an image library.

In this embodiment, the key images of the current video intercepted are sequenced according to a playing order in the current video, so as to form the image library of the current video in a comic strip mode. The comic strip mode means that, that the images of the video with key content are intercepted to form a series of pictures in the playing order, such that the requirement for viewing the key content may be fulfilled.

In step S104: a playing request is received, corresponding key images are read from the image library according to the playing request for playing.

Figure 2:
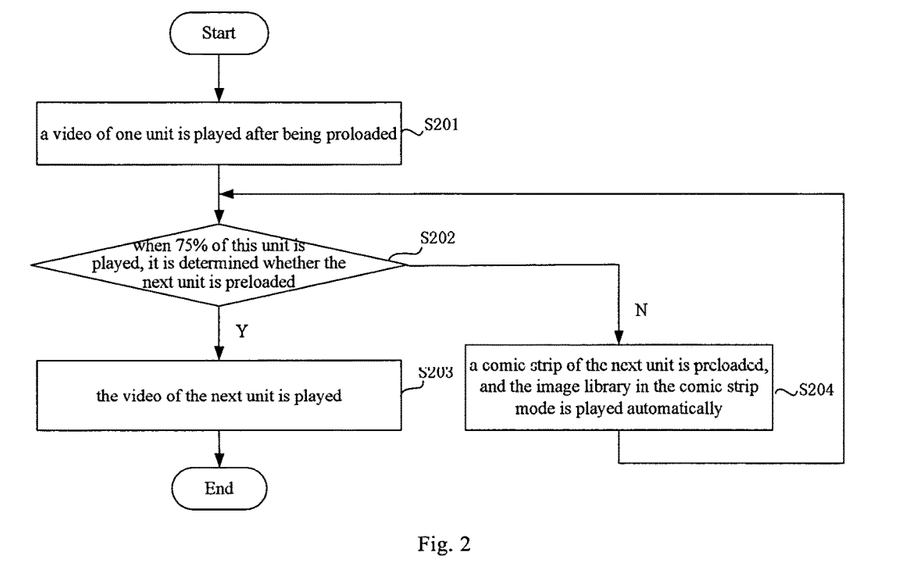
FIG. 2 is a flow chart of playing a video according to an embodiment of the present invention.

In this embodiment, the video content includes a comic strip mode and a normal video mode. The user may select to view the video, or to browse the content by viewing the image library in the comic strip mode. These two modes may be switched to each other. When the video is unsmooth, it may be automatically switched to the comic strip mode. Specifically, during playing of the video, the video or key images is/are preloaded automatically. If a preloaded amount is lower than a preset threshold (for example, if the preloaded amount cannot support the continuous playing for 5 seconds), then it is switched to the comic strip mode, so as to ensure the user to view the content. Meanwhile, it may be switched to the video mode manually by the user to wait for the preload. For example, as shown in FIG. 2, the video is divided into a plurality of units, and is preloaded for playing in unit. Specifically, the following steps are included.

In step S201: a video of one unit is played after being preloaded.

In step S202: when 75% of this unit is played, it is determined whether the next unit is preloaded. If the next unit is preloaded, step S203 is executed, or if the next unit is not preloaded, step S204 is executed.

In step S203: the video of the next unit is played, and the operation is finished.

In step S204: it is switched to the comic strip mode, and a comic strip of the next unit is preloaded, so as to enable the user to browse the content in time, and then step S202 is executed so as to switch back to the video mode after the video of the next unit is preloaded, and the video of the corresponding unit is played.

In this embodiment, when being played in the comic strip mode, the video may be played in an automatic way or in a manual way. For the automatic way, the corresponding key images are read in sequence from the image library according to an automatic playing request for playing, and frames in the image library are played automatically at a preset time interval (such as one frame per three seconds). In this way, the user may read the subtitles smoothly, and such playing speed is in conformity with a playing speed at which the user may view the video normally, thus the user may gain an experience of viewing the video normally. It may be understood that, the playing speed may be preset according to the user's requirement. For the manual way or the automatic way, the corresponding key images may be read from the image library according to a calling request for playing, for example, if the preloaded amount cannot support the continuous playing for 5 seconds, the corresponding key images may be read from the image library for playing, After playing for a while, if the preloaded amount can support the continuous playing for 5 seconds, it is stopped reading key images from the image library, and normal playing of the video is recovered.

With the above comic strip mode, the data traffic may be saved. For example, a standard video with duration of 30 minutes costs over 100 M of data traffic, while it costs only 9 M of data traffic if the video is played in the comic strip mode, and thus 90% of data traffic is saved. Therefore, the user may track a TV show with a small amount of data traffic, thereby improving an access frequency and the user's satisfaction.

In the comic strip mode, each frame image further supports a function of interacting with the user. The user may conduct interactions for the key content, and create abundant user generated contents. Further, advertisements in forms of video and picture may be inserted into the image library in a form of picture, so as to provide the user with more information. The user may track the TV show at any time and any where using time segments, just like reading a novel, or viewing a picture, which is not limited by the environment and network.

With the method for processing a video image, by acquiring the information of the current video, intercepting the key images of the current video according to the information of the current video, and sequencing the key images to generate the image library, and reading the corresponding key images from the image library according to the playing request for playing, not only the data traffic is saved, but also it enables the user to preview the video quickly in the case that the network is poor, such that the user may learn about the video content quickly and conveniently, and the possibility of quitting the mobile video when the mobile video is unsmooth is reduced, thus improving the user experience.

Figure 3:
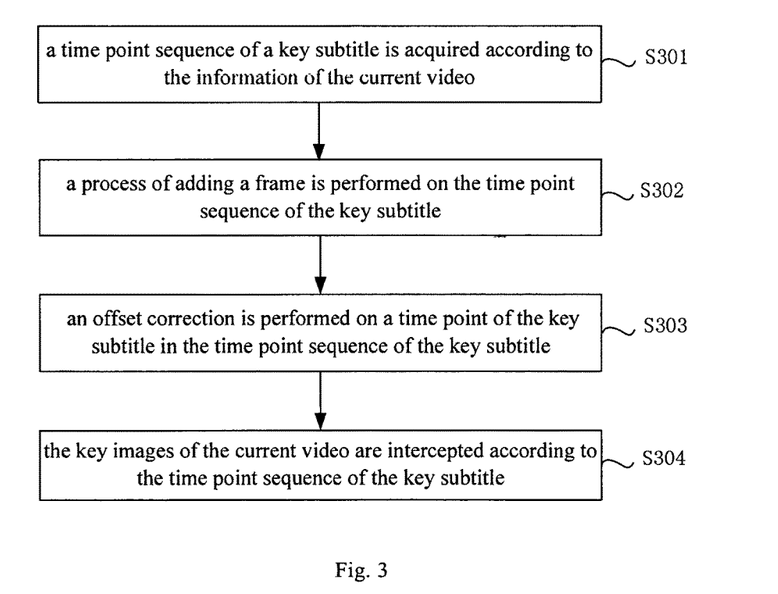
FIG. 3 is a flow chart of intercepting key images of a current video according to a specific embodiment of the present invention.

In order to intercept the key images of the current video, to enable the user to preview the video and learn about the content more quickly, conveniently and completely, embodiments of the present invention provide a method for intercepting the key images of the current video. As shown in FIG. 3, the method may include following steps.

In step S301: a time point sequence of a key subtitle is acquired according to the information of the current video.

In this embodiment, a start time point and an end time point of each speech subtitle in the current video may be acquired by a technology such as network, speech recognition or image recognition, and a frame image is intercepted at the end time point of the each speech subtitle, so as to ensure that all the subtitles may be viewed completely by the intercepted images.

Specifically, the time point sequence of the key subtitle may be acquired based on a subtitle document. The subtitle of a movie may be a subtitle document in a form of graph or text. For the subtitle document in the form of graph, the time range sequence of the subtitle with dialogue in the video may be acquired by analyzing an index document thereof. For the subtitle document in the form of text (such as, suffixed with ".srt" or ".ass"), the time range sequence of the subtitle in the video may be acquired by automatically analyzing with a current program. Finally, the time point sequence of the key subtitle is generated according to a middle value or other value of each member in the time range sequence of the subtitle; of course, it should be ensured that the video frames with complete subtitles may be required with the above middle value of other value.

Instead of acquiring the time point sequence of the key subtitle based on the subtitle document, the start time point and the end time point of the speech subtitle may be acquired in a speech analysis way (i.e., identifying voice based on the speech recognition), such that the time points of the key subtitle may be acquired. Also, the image recognition may be adopted. That is, the video is converted into continuous frames at a preset time interval, the frames having complete subtitles in specific areas may be identified in the image recognition way, and then the final image frame sequence is acquired after a de-duplication is performed. Times corresponding to the image frame sequences are the time point sequence of the key subtitle.

Preferably, the preset time interval is greater than $1/24$ seconds, because a sampling rate of this kind of video is 24 frames per second.

In step S302: a process of adding a frame is performed on the time point sequence of the key subtitle.

This step is optional. If an interval between two adjacent image frames is too long, for example, greater than a preset period (such as 5 s), a supplement frame is intercepted per five seconds. The reason is that, even there is no speech in this period, there may be movements occurring, which may affect the user's understanding of the content. Therefore, for a video with duration of 1 minute, 15 images are intercepted, so as to ensure the continuity of content, a size of each image is 20 k, and thus a size of all images of the current video is 300 k in total.

Figure 4:
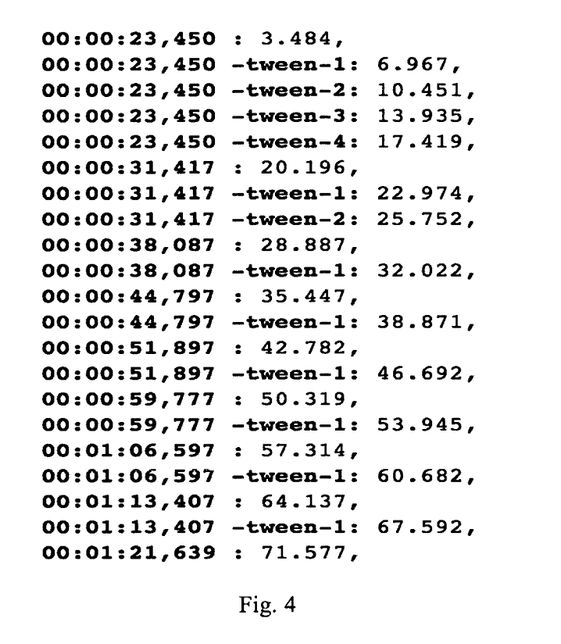
FIG. 4 is a schematic diagram showing adding a frame into a time point sequence of a key subtitle according to another embodiment of the present invention.

Specifically, the process of frame adding may include: determining whether a time interval between two adjacent time points of the key subtitle is greater than a preset period, if yes, acquiring a new time point between the two adjacent time points of the key subtitle and inserting the new time point into the time point sequence of the key subtitle. For example, if the time interval between two adjacent time points of the key subtitle is greater than 4 s, an image is inserted at a middle time point therebetween. As shown in FIG. 4, the time interval between a time point 3.484 and a time point 20.196 is greater than four times of 4 s, thus 4 frames are required to be inserted therebetween. The frames with a mark "-tween" are inserted frames. The time interval between a time point 20.196 and a time point 28.887 is greater than twice of 4 s, thus 2 frames are required to be inserted therebetween, and so on. It should be ensured that there is at least one image per 4 seconds, so as to ensure the continuity of content.

An example of a result of realizing the above process of frame adding by an algorithm is as follow.

```
[
    {
        ROW: "00:00:23,450 --> 00:00:29,387 ",
        ROW_START: 23.45,
        ROW_END: 29.387,
        KEY: 26.4185,
        KEY_OFFSET_THIS: 17.4185,
        KEY_OFFSET_PREV: 0,
        KEY_ORDERS: [
            3.484,
            6.967,
            10.451,
            13.935,
            17.419
        ]
    },
    {
        ROW: "00:00:31,417 --> 00:00:38,087 ",
        ROW_START: 31.417,
        ROW_END: 38.087,
        KEY: 34.752,
        KEY_OFFSET_THIS: 25.752,
        KEY_OFFSET_PREV: 17.4185,
        KEY_ORDERS: [
            20.196,
            22.974,
            25.752
        ]
    },
    {......},
    {......},
```

The symbol "......" indicates that several key time point sequences are omitted afterwards.

In step S303: an offset correction is performed on a time point of the key subtitle in the time point sequence of the key subtitle.

This step is also optional. Since there may be errors in the subtitle document, the offset correction is required to be performed on the time points of the key subtitle acquired according to the subtitle document for automatically correction. In a correction program, an offset parameter may be determined by verifying a start time of top 10 time ranges of subtitles. The offset parameter may be acquired automatically by comparing the start time acquired in the image recognition way or in the speech recognition way with the start time of subtitles in the subtitle document, or may be acquired in other ways. The offset correction is performed on the time point sequence of the key subtitle via the offset parameter.

It should be noted that, the above steps S302 and S303 are not executed in a strict order, that is, the process of adding a frame may be executed firstly, and then the offset correction is performed; or the offset correction is performed firstly, and then the process of adding a frame is executed.

In step S304: the key images of the current video are intercepted according to the time point sequence of the key subtitle.

In this embodiment, the key images of the current video may be intercepted according to the time point sequence of the key subtitle by a free open-source cross-platform video and audio stream program FFmpeg (program for processing audio and video).

In this embodiment, the key images of the current video are sequenced according to a playing order in the current video, so as to form the image library of the current video in a comic strip mode. The comic strip mode means that, that the images of the video with key content are intercepted to form a series of books in the playing order, such that the requirement for viewing the key content may be fulfilled. The comic strip mode has a prominent advantage in a mobile environment, which costs a small amount of loaded data traffic and has a fast loading speed. While a high definition video with duration of 1 minute is about 20 M, a standard definition video with duration of 1 minute is about 4 M, and the image library in the comic strip mode is only 300 k. Assuming that a network speed is 10 k/s, it takes 34 minutes to load the high definition video and 7 minutes to load the standard definition video, while only 30 seconds is required to load the image library in the comic strip mode.

In embodiments of the present invention, by performing the process of adding a frame on the time point sequence of the key subtitle and performing the offset correction on the time points in the time point sequence of the key subtitle, the intercepted images are more consecutive, accurate and comprehensive, such that the user may preview the video quickly, and learn about the content more quickly, conveniently and completely, thus improving the user experience.

Figure 5:
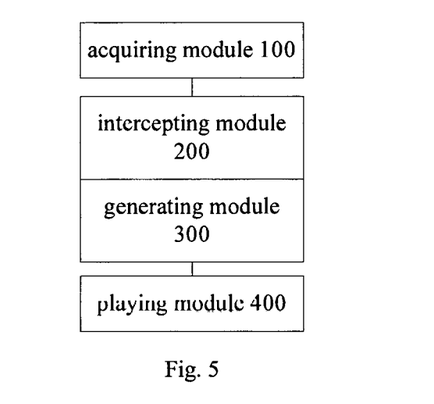
FIG. 5 is a block diagram of an apparatus for processing a video image according to an embodiment of the present invention.

FIG. 5 is a block diagram of an apparatus for processing a video image according to an embodiment of the present invention. As shown in FIG. 5, the apparatus includes an acquiring module 100, an intercepting module 200, a generating module 300 and a playing module 400.

The acquiring module 100 is configured to acquire information of a current video.

In this embodiment, the acquiring module 100 acquires the information of the current video from a video resource library. The information may include a path of the video resource, a path of a subtitle document, etc.

The intercepting module 200 is configured to intercept key images of the current video according to the information of the current video. Each key image includes a video frame image having a complete subtitle.

In this embodiment, the intercepting module 200 may acquire a time point sequence of key subtitle according to the information of the current video acquired by the acquiring module 100. After the time point sequence of the key subtitle is acquired, the intercepting module 200 may perform a process of adding a frame on the time point sequence of the key subtitle, or may perform an offset correction on a time point in the time point sequence of the key subtitle, and then intercept the key images of the current video according to the time point sequence of the key subtitle. It should be noted that, the processes of adding a frame and performing an offset correction are not executed in a strict order, that is, the process of adding a frame may be executed firstly, and then the offset correction is performed; or the offset correction is performed firstly, and then the process of adding a frame is executed.

The generating module 300 is configured to sequence the key images intercepted by the intercepting module 200 to generate an image library.

In this embodiment, the generating module 300 sequences the key images of the current video according to a playing order in the current video, so as to form the image library of the current video in a comic strip mode. The comic strip mode means that, that the images of the video with key content are intercepted to form a series of pictures in the playing order, such that the requirement for viewing the key content may be fulfilled.

The playing module 400 is configured to receive a playing request and to read corresponding key images from the image library according to the playing request for playing.

In this embodiment, the video content includes a comic strip mode and a normal video mode. The user may select to view the video, or to browse the content by viewing the image library in the comic strip mode. These two modes may be switched to each other. When the video is unsmooth, it may be automatically switched to the comic strip mode. Specifically, during playing of the video, the video or key images is/are preloaded automatically. If a preloaded amount is lower than a preset threshold (for example, if the preloaded amount cannot support the continuous playing for 5 seconds), then it is switched to the comic strip mode, so as to ensure the user to view the drama content. Meanwhile, it may be switched to the video mode manually by the user to wait for the preload.

In this embodiment, when being played in the comic strip mode, the video may be played in an automatic way or in a manual way. For the automatic way, the playing module 400 reads the corresponding key images in sequence from the image library according to an automatic playing request for playing, and plays frames in the image library automatically at a preset time interval (such as one frame per three seconds). In this way, such playing speed may ensure the user to read the subtitles smoothly and may be in conformity with a playing time of a general TV show. It may be understood that, the playing speed may be preset according to the user's requirement. For the manual way or the automatic way, the playing module 400 may read the corresponding key images from the image library according to a calling request for playing, for example, if the preloaded amount cannot support the continuous playing for 5 seconds, the corresponding key images may be read from the image library for playing, After playing for a while, if the preloaded amount can support the continuous playing for 5 seconds, it is stopped reading key images from the image library, and the normal playing of the video is recovered.

With the above comic strip mode, the data traffic may be saved. For example, a standard video with duration of 30 minutes costs over 100 M of data traffic, while it costs only 9 M of data traffic if the video is played in the comic strip mode, and thus 90% of data traffic is saved. Therefore, the user may track the TV show with a small amount of data traffic, thereby improving an access frequency and the user's satisfaction.

In the comic strip mode, each frame image further supports a function of interacting with the user. The user may conduct interactions for the key content, and create abundant user generated contents. Further, advertisements in forms of video and picture may be inserted into the image library in a form of picture, so as to provide the user with more information. The user may track the TV show at any time and any where using time segments, just like reading a novel, or viewing a picture, which is not limited by the environment and network.

With the method for processing a video image, by acquiring the information of the current video, intercepting the key images of the current video according to the information of the current video, and sequencing the key images to generate the image library, and reading the corresponding key images from the image library according to the playing request for playing, not only the data traffic is saved, but also it enables the user to preview the video quickly in the case that the network is poor, such that the user may learn about the video content quickly and conveniently, and the possibility of quitting the mobile video when the mobile video is unsmooth is reduced, thus improving the user experience.

Figure 6:
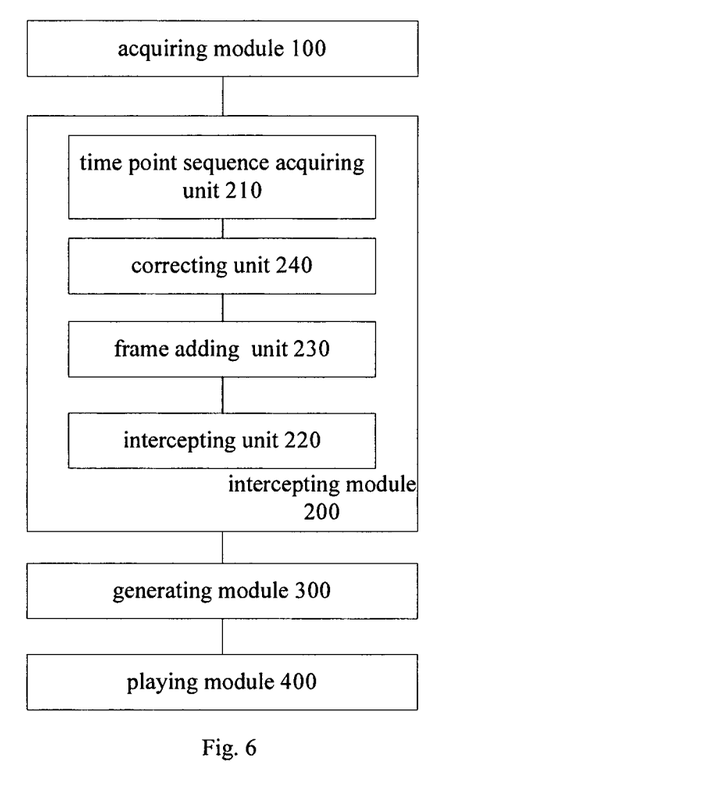
FIG. 6 is a block diagram of an apparatus for processing a video image according to a specific embodiment of the present invention.
Figure 7:
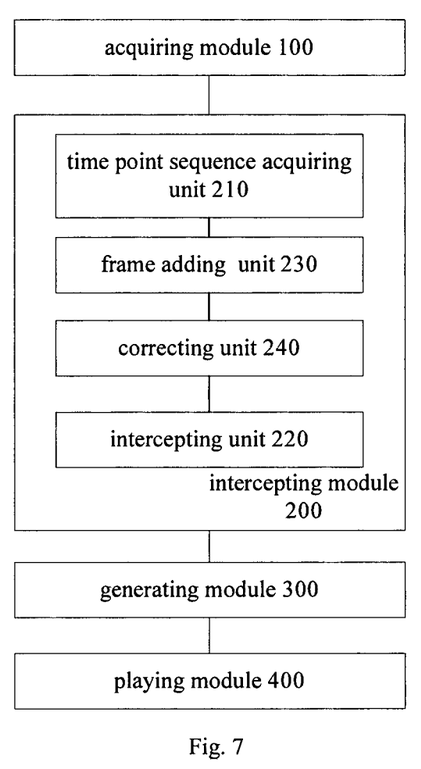
FIG. 7 is another block diagram of an apparatus for processing a video image according to a specific embodiment of the present invention.

FIG. 6 is a block diagram of an apparatus for processing a video image according to a specific embodiment of the present invention. FIG. 7 is another block diagram of an apparatus for processing a video image according to a specific embodiment of the present invention. As shown in FIG. 6 and FIG. 7, the apparatus includes an acquiring module 100, an intercepting module 200, a generating module 300 and a playing module 400. The intercepting module 200 specifically includes a time point sequence acquiring unit 210, an intercepting unit 220, a frame adding unit 230 and a correcting unit 240.

The time point sequence acquiring unit 210 is configured to acquire a time point sequence of a key subtitle according to the information of the current video.

In this embodiment, the time point sequence acquiring unit 210 may acquire a start time point and an end time point of each speech subtitle in the current video by a technology such as network, speech recognition or image recognition, and a frame image is intercepted at the end time point of the each speech subtitle, so as to ensure that all the subtitles may be viewed completely by the intercepted images.

Specifically, the time point sequence acquiring unit 210 may acquire the time point sequence of the key subtitle based on a subtitle document. The subtitle of a movie may be a subtitle document in a form of graph or text. For the subtitle document in the form of graph, the time point sequence acquiring unit 210 may acquire the time range sequence of the subtitle with dialogue in the video by analyzing an index document thereof. For the subtitle document in the form of text (such as, suffixed with ".srt" or ".ass"), the time point sequence acquiring unit 210 may acquire the time range sequence of the subtitle in the video by automatically analyzing with a current program. Finally, the time point sequence of the key subtitle is generated according to a middle value or other value of each member in the time range sequence of the subtitle; of course, it should be ensured that the video frames with complete subtitles may be acquired with the above middle value or other value.

Instead of acquiring the time point sequence of the key subtitle based on subtitle document, the time point sequence acquiring unit 210 may further acquire the start time point and the end time point of the speech subtitle in a speech analysis way (i.e., identifying voice based on the speech recognition), such that the time points of the key subtitle may be acquired. Also, the time point sequence acquiring unit 210 may adopt the image recognition. That is, the video is converted into continuous frames at a preset time interval, the frames having complete subtitles in specific areas may be identified in the image recognition way, and then the final image frame sequence is acquired after a de-duplication is performed. Times corresponding to the image frame sequences are the time point sequence of the key subtitle.

The intercepting unit 220 is configured to intercept the key images of the current video according to the time point sequence of the key subtitle.

The frame adding unit 230 is configured to determine whether a time interval between two adjacent time points of the key subtitle in the time point sequence of the key subtitle acquired by the time point sequence acquiring unit 210 or corrected by the correcting unit 240 is greater than a preset period, if yes, to acquire a new time point between the two adjacent time points of the key subtitle and to insert the new time point into the time point sequence of the key subtitle.

If an interval between two adjacent image frames is too long, for example, greater than a preset period (such as 5 s), a supplement frame is intercepted per five seconds. The reason is that, even there is no speech in this period, there may be movements occurring, which may affect the user's understanding of the content. Therefore, for a video with duration of 1 minute, 15 images are intercepted, so as to ensure the continuity of content, a size of each image is 20 k, and thus a size of all images of the current video is 300 k in total.

Specifically, the frame adding unit 230 determines whether a time interval between two adjacent time points of the key subtitle is greater than a preset period, if yes, acquiring a new time point between the two adjacent time points of the key subtitle and inserting the new time point into the time point sequence of the key subtitle. For example, if the time interval between two adjacent time points of the key subtitle is greater than 5 s, an image is inserted at a middle time point therebetween. If the time interval between two adjacent time points of the key subtitles is greater than 6 s, two images are inserted at a middle time point therebetween, and so on. It should be ensured that there is at least one image per 4 seconds, so as to ensure the continuity of drama content.

The correcting unit 240 is configured to perform an offset correction on a time point of the key subtitle in the time point sequence of the key subtitle acquired by the time point sequence acquiring unit 210 or by the frame adding unit 230.

Since there may be errors in the subtitle document, the offset correction is required to be performed on the time points of the key subtitle acquired according to the subtitle document for automatically correction. The correcting unit 240 may determine an offset parameter by verifying a start time of top 10 time ranges of subtitles. The offset parameter may be acquired automatically by comparing the start time acquired in the image recognition way or in the speech recognition way with the start time of subtitles in the subtitle document, or may be acquired in other ways. The offset correction is performed on the time point sequence of the key subtitles via the offset parameter.

It should be noted that, the process of adding a frame conducted by the frame adding unit 230 and the offset correction conducted by the correcting unit 240 are not executed in a strict order, that is, the process of adding a frame may be executed firstly, and then the offset correction is performed; or the offset correction is performed firstly, and then the process of adding a frame is executed.

With the apparatus according to embodiments of the present invention, by performing the process of adding a frame on the time point sequence of the key subtitle and performing the offset correction on the time points in the time point sequence of the key subtitle, the intercepted images are more consecutive, accurate and comprehensive, such that the user may preview the video quickly, and learn about the content more quickly, conveniently and completely, thus improving the user experience.

To realize the above embodiments, the present invention further provides a storage medium for storing an application program which is configured to execute the method for processing a video image according to any embodiment of the present invention.

It should be understood that each part of the present invention may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. Thus, the appearances of the above phrases in various places throughout this specification are not necessarily referring to the same embodiment or example of the present invention. Furthermore, the particular features or characteristics may be combined in any suitable manner in one or more embodiments or examples.

Although the embodiments of the present invention have been shown and described, it would be appreciated by those skilled in the art that changes, modifications, alternatives and variations can be made in the embodiments without departing from principles and spirit of the present invention. The scope of the present invention is limited by the appended claims and equivalents thereof.

What is claimed is:

1. A method for processing a video image, comprising:
    acquiring information of a current video;
    intercepting key images of the current video according to the information of the current video, wherein each key image is identified as comprising a video frame image having a complete subtitle;
    sequencing and saving the key images to generate an image library, the image library being a compressed representation of the current video; and
    receiving a playing request, and reading corresponding key images from the image library according to the playing request for playing;
    wherein intercepting key images of the current video according to the information of the current video comprises:
        acquiring a time point sequence of a key subtitle according to the information of the current video; and
        intercepting the key images of the current video correspondingly according to the time point sequence of the key subtitle;
        after acquiring a time point sequence of a key subtitle according to the information of the current video and before intercepting the key images of the current video correspondingly according to the time point sequence of the key subtitle, further comprising:
            determining whether a lime interval between two adjacent time points of the key subtitle is greater than a present period, if yes, acquiring a new time point between the two adjacent time points of the key subtitle and inserting the new time point into the time point sequence of the key subtitle; and/or
            performing an offset correction on a time point of the key subtitle in the time point sequence of the key subtitle.

2. The method according to claim 1, wherein acquiring a time point sequence of key subtitle according to the information of the current video comprises:

acquiring a time range sequence of a subtitle according to a subtitle document of the current video, and generating the time point sequence of the key subtitle according to the time range sequence of the subtitle; or performing speech recognition on the current video to acquire a time range sequence of a subtitle, and generating the time point sequence of the key subtitle according to the time range sequence of the subtitle; or converting the current video into video frames, identifying a video frame sequence having a complete subtitle in a preset area in an image recognition way, performing de-duplication on the video frame sequence, and using time points corresponding to a de-duplicated video frame sequence as the time point sequence of the key subtitle.

3. The method according to claim 1, wherein receiving a playing request, and reading corresponding key images from the image library according to the playing request for playing comprises:

receiving an automatic playing request, and reading corresponding key images in sequence from the image library according to the automatic playing request for playing; or receiving a calling request, and reading corresponding key images from the image library according to the calling request for playing.

4. The method according to claim 3, after reading corresponding key images from the image library according to the calling request for playing, further comprising:

receiving a stop playing request, and stopping reading the corresponding key images from the image library according to the stop playing request.

5. An apparatus for processing a video image, comprising:
one or more processors configured to execute one or more software modules, the one or more software modules including:
an acquiring module, configured to acquire information of a current video;
an intercepting module, configured to intercept key images of the current video according to the information of the current video acquired by the acquiring module, wherein each key image is identified as comprising a video frame image having a complete subtitle;
a generating module, configured to sequence the key images intercepted by the intercepting module to generate an image library, the image library being a compressed representation of the current video; and
a playing module, configured to receive a playing request, and read corresponding key images from the image library generated by the generating module according to the playing request for playing,
wherein the intercepting module comprises:
a time point sequence acquiring unit, configured to acquire a time point sequence of a key subtitle according to the information of the current video;
an intercepting unit, configured to intercept the key images of the current video correspondingly according to the time point sequence of the key subtitle; and
a frame adding unit and a correcting unit which are located between the time point sequence acquiring unit and the intercepting unit, wherein:
the frame adding unit is configured to determine whether a time interval between two adjacent time points of the key subtitle in the time point sequence of the key subtitle acquired by the time point sequence acquiring unit or corrected by the correcting unit is greater than a preset period, if yes, to acquire a new time point between the two adjacent time points of the key subtitle and to insert the new time point into the time point sequence of the key subtitle; and/or
the correcting unit is configured to perform an offset correction on a time point of the key subtitle in the time point sequence of the key subtitle acquired by the time point sequence acquiring unit or by the frame adding unit.

6. The apparatus according to claim 5, wherein the time point sequence acquiring unit is specifically configured to:
acquire a time range sequence of a subtitle according to a subtitle document of the current video, and generate the time point sequence of the key subtitle according to the time range sequence of the subtitle; or
perform speech recognition on the current video to acquire a time range sequence of subtitles, and generate the time point sequence of the key subtitle according to the time range sequence of the subtitle; or
convert the current video into video frames, identify a video frame sequence having a complete subtitle in a preset area in an image recognition way, perform de-duplication on the video frame sequence, to use time points corresponding to a de-duplicated video frame sequence as the time point sequence of the key subtitle.

7. The apparatus according to claim 5, wherein the playing module is specifically configured to:
receive an automatic playing request, and read corresponding key images in sequence from the image library according to the automatic playing request for playing; or
receive a calling request, and read corresponding key images from the image library according to the calling request for playing.

8. The apparatus according to claim 7, wherein the playing module is further configured to:
receive a stop playing request and stop reading the corresponding key images from the image library according to the stop playing request, after corresponding key images are read from the image library according to the calling request for playing.

9. A non-transitory storage medium for storing an application, wherein the application is configured to execute a method for processing a video image, the method comprising:
acquiring information of a current video;
intercepting key images of the current video according to the information of the current video, wherein each key image is identified as comprising a video frame image having a complete subtitle;
sequencing the key images to generate an image library, the image library being a compressed representation of the current video; and
receiving a playing request, and reading corresponding key images from the image library according to the playing request for playing;
wherein intercepting key images of the current video according to the information of the current video comprises:
acquiring a time point sequence of a key subtitle according to the information of the current video; and
intercepting the key images of the current video correspondingly according to the time point sequence of the key subtitle;

wherein after acquiring a time point sequence of a key subtitle according to the information of the current video and before intercepting the key images of the current video correspondingly according to the time point sequence of the key subtitle, the method further comprises:

determining whether a time interval between two adjacent time points of the key subtitle is greater than a present period, if yes, acquiring a new time point between the two adjacent time points of the key subtitle and inserting the new time point into the time point sequence of the key subtitle; and/or performing an offset correction on a time point of the key subtitle in the time point sequence of the key subtitle.

10. The storage medium according to claim 9, wherein acquiring a time point sequence of key subtitle according to the information of the current video comprises:

acquiring a time range sequence of a subtitle according to a subtitle document of the current video, and generating the time point sequence of the key subtitle according to the time range sequence of the subtitle; or performing speech recognition on the current video to acquire a time range sequence of a subtitle, and generating the time point sequence of the key subtitle according to the time range sequence of the subtitle; or converting the current video into video frames, identifying a video frame sequence having a complete subtitle in a preset area in an image recognition way, performing de-duplication on the video frame sequence, and using time points corresponding to a de-duplicated video frame sequence as the time point sequence of the key subtitle.

11. The storage medium according to claim 9, wherein receiving a playing request, and reading corresponding key images from the image library according to the playing request for playing comprises:

receiving an automatic playing request, and reading corresponding key images in sequence from the image library according to the automatic playing request for playing; or receiving a calling request, and reading corresponding key images from the image library according to the calling request for playing.

12. The storage medium according to claim 9, after reading corresponding key images from the image library according to the calling request for playing, the method further comprises:

receiving a stop playing request, and stopping reading the corresponding key images from the image library according to the stop playing request.

* * * * *